(12) United States Patent
Fu et al.

(10) Patent No.: US 9,396,545 B2
(45) Date of Patent: Jul. 19, 2016

(54) SEGMENTATION OF GROUND-BASED LASER SCANNING POINTS FROM URBAN ENVIRONMENT

(75) Inventors: Yan Fu, Shanghai (CN); Jin Yang, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 1017 days.

(21) Appl. No.: 13/399,158

(22) Filed: Feb. 17, 2012

(65) Prior Publication Data

US 2013/0218472 A1   Aug. 22, 2013

(51) Int. Cl.
| | |
|---|---|
| *G01V 3/38* | (2006.01) |
| *G06T 7/00* | (2006.01) |
| *G06K 9/00* | (2006.01) |
| *G06F 11/30* | (2006.01) |
| *G01S 17/89* | (2006.01) |
| *G01S 7/48* | (2006.01) |

(52) U.S. Cl.
CPC .......... *G06T 7/0081* (2013.01); *G06K 9/00637* (2013.01); *G01S 7/4802* (2013.01); *G01S 17/89* (2013.01); *G06T 2207/10028* (2013.01); *G06T 2207/20016* (2013.01); *G06T 2207/20141* (2013.01)

(58) Field of Classification Search
CPC ......... G01S 17/89; G06T 1/00; G06T 1/0007; G06T 2200/04
USPC .............................................................. 702/5
See application file for complete search history.

(56) References Cited

U.S. PATENT DOCUMENTS

| | | | |
|---|---|---|---|
| 3,069,654 | A | 12/1962 | Hough |
| 5,988,862 | A | 11/1999 | Kacyra et al. |
| 6,256,038 | B1 | 7/2001 | Krishnamurthy |
| 7,995,055 | B1 * | 8/2011 | Ma et al. ........................ 345/420 |
| 2002/0149585 | A1 | 10/2002 | Kacyra et al. |
| 2002/0158870 | A1 | 10/2002 | Brunkhart et al. |
| 2003/0001835 | A1 | 1/2003 | Dimsdale et al. |
| 2005/0286767 | A1 | 12/2005 | Hager et al. |
| 2006/0112042 | A1 * | 5/2006 | Platt et al. ........................ 706/20 |
| 2008/0075326 | A1 * | 3/2008 | Otani et al. .................... 382/106 |
| 2010/0164951 | A1 | 7/2010 | Stewart |
| 2010/0302247 | A1 | 12/2010 | Perez et al. |

(Continued)

FOREIGN PATENT DOCUMENTS

WO   2011085437   7/2011

OTHER PUBLICATIONS

Douillard, B. et al., "On the Segmentation of 3D LIDAR Point Clouds", International Conference on Robotics and Automation, The Australian Center for Field Robotics, The University of Sydney, Australia, 2011, Sydney, Australia.*

(Continued)

*Primary Examiner* — Phuong Huynh
(74) *Attorney, Agent, or Firm* — Gates & Cooper LLP

(57) ABSTRACT

A method, apparatus, system, and article of manufacture provide object descriptors for objects in point cloud data for an urban environment by segmenting the point cloud data. Point cloud data for an urban environment is obtained using a ground-based laser scanner. Terrain points are filtered out from the point cloud data using ground filtering. The point cloud data is then segmented into two or more blocks. Objects that lie on neighboring adjacent blocks are combined. Object descriptors for the combined objects are then provided (e.g., to the user or a program used by the user).

20 Claims, 10 Drawing Sheets

(56) References Cited

U.S. PATENT DOCUMENTS

2011/0184695 A1  7/2011  Grzesiak
2011/0304628 A1  12/2011  Fu et al.

OTHER PUBLICATIONS

PCT International Search Report and Written Opinion dated Apr. 26, 2013 for PCT Application No. PCT/US2013/026449.
Arya, S. et al., "An optimal algorithm for approximate nearest neighbor searching in fixed dimensions," Journal of ACM, vol. 45(6), 1998, 891-923.
Bauer, U., "Parametric reconstruction of bent tube surfaces," Proceedings of the 2007 International Conference on Cyberworlds (Oct. 24-26, 2007), International Conference on Cyberworlds, IEEE Computer Society, Washington, DC, 465-474.
Berkmeier, M. et al., "Determining the axis of a surface of revolution using tactile sensing," IEEE Transactions on Pattern Analysis and Machine Intelligence, vol. 15, No. 10, Oct. 1993, 1079.
Bosche, F., "'Model Spell Checker' for primitive-based as-built modeling in construction," Master of Science Thesis, Supervisor: Dr. Katherine A. Liapi and Dr. Carl T. Haas, Department of Civil, Architectural and Environmental Engineering, University of Texas at Austin, Dec. 2003.
Bosche, F. et al., "Automated retrieval of 3D CAD model objects in construction range images," Automation in Construction 17 (2008) 499-512.
Boykov, Y. et al., "Graph Cuts and Efficient N-D Image Segmentation", International Journal of Computer Vision, 2006, pp. 109-131, vol. 70(2), The Netherlands.
Briese, C., et al., "Applications of the Robust Interpolation for DTM Determination", Institute of Photogrammetry and Remote Sensing, Vienna University of Technology, 2002, pp. 55-61, vol. XXXIII, Vienna, Austria.
De Toledo, R. et al., "Reverse engineering for industrial-plant CAD models," Proceedings of TMCE 2008, Apr. 21-25, 2008.
Douillard, B. et al., "On the Segmentation of 3D LIDAR Point Clouds", International Conference on Robotics and Automation, The Australian Centre for Field Robotics, The University of Sydney, Australia, 2011, Sydney, Australia.
El-Mehalawi, M. et al., A Database System of Mechanical Components Based on Geometric and Topological Similarity. Part I: Representation, 2003, Computer-Aided Design 35:83-94.
El-Mehalawi, M. et al., A Database System of Mechanical Components Based on Geometric and Topological Similarity. Part II: Indexing, Retrieval, Matching and Similarity Assessment, 2003, Computer-Aided Design 35:95-105.
Ermes, P. et al., "A photogrammetric measurement method using CSG models," IAPRS, vol. 32, part 5/W11, 1999, pp. 36-42.
Fu, Y. et al., "Primitive shape extraction from unorganized point cloud data," Technical Report, Autodesk, 2010.
Fung, G., "A comprehensive overview of basic clustering algorithms," Jun. 22, 2001.
Gallup, D. et al., "Reverse engineering of pipe layouts and 3D point set damage models," Technical report of University of Utah, Dec. 27, 2004.
Golovinskiy, A. et al., "Min-Cut Based Segmentation of Point Clouds," IEEE Workshop on Search in 3D and Video (S3DV) at ICVV, Sep. 2009.
Golovinskiy, A. et al., "Shape Based Recognition of 3D Point Clouds in Urban Environments," International Conference on Computer Vision (ICCV), Sep. 2009.
Hernandez, J. et al., "Morphological Segmentation of Building Facade Images," ICIP09—IEEE International Conference on Image Processing, 2009, Cairo, Egypt.
Jiang, X. et al., "A novel parameter decomposition approach to faithful fitting of quadric surfaces," Pattern Recognition: 27th DAGM Symposium, Lecture Notes in Computer Science, vol. 3663, 2005, pp. 168-175.
Kazhdan, M. et al., "Poisson surface reconstruction," Eurographics Symposium on Geometry Processing (2006) 61-70.
Ke, Y. et al., "Rotational surface extraction based on principal direction Gaussian image from point cloud," Journal of Zhejiang University, vol. 40, No. 6, Jun. 2006. (English abstract).
Konig, S. et al., "Consistent propagation of normal orientations in point clouds," proceedings of of VMV, 2009.
Kraus, K. et al., "Advanced DTM Generation from LiDAR Data," Institute of Photogrammetry and Remote Sensing, Vienne University of Technology, 2001, vol. XXXIV, 3/W4, Vienna, Austria.
Kwon, S. et al., "Algorithms for fitting Cylindrical Objects to sparse range point clouds for rapid workspace modeling," 2003, Proceedings of the 20th International Symposium on Automation and Robotics in Construction (ISARC), Eindhoven, the Netherlands, p. 173-178.
Lou, K. et al., "A Reconfigurable 3D Engineering Shape Search System Part II: Database Indexing, Retrieval and Clustering," 2003, Proceedings of ASME DETC' 03 23rd Computers and Information Engineering (CIE) Conference, Chicago, p. 1-10.
Lukacs, G. et al., "Faithful least-squares fitting of spheres, cylinders, cones and tori for reliable segmentation," Fifth European Conf. Computer Vision, vol. I, 1998, pp. 671-686.
Lukacs, G. et al., "Geometric Least-Squares Fitting of Spheres," Cylinders, Cones, and Tori, 1997, RECCAD, Deliverable Document 2 and 3, COPERNICUS project, No. 1,068 (Budapest)m Geometric Modelling Laboratory Studies, 1997/5, Computer and Automation Research Institute, Budapest, R.R. Martin and T. VaArady, eds.
Lutton, E. et al., "Contribution to the determination of vanishing points using hough transform," IEEE Transactions on Pattern Analysis and Machine Intelligence, vol. 16, No. 4, Apr. 1994, 430.
Marshall, D. et al., "Robust segmentation of primitives from range data in the presence of geometric degeneracy," IEEE Transactions on Pattern Analysis and Machine Intelligence, vol. 23, No. 3, Mar. 2001, 304.
Melkumyan, N., "Surface-based Synthesis of 3D Maps for Outdoor Unstructured Environments," Australian Centre for Field Robotics, Department of Aerospace, Mechanical and Mechatronics Engineering, The University of Sydney, Aug. 2008, Sydney, Australia.
Mitra, N. et al., "Estimating surface normals in noisy point cloud data," International Journal of Computational Geometry & Applications, 4(4-5), Jan. 23, 2004, pp. 261-276.
Moosmann, F. et al., "Segmentation of 3D Lidar Data in non-flat Urban Environments using a Local Convexity Criterion," Intelligent Vehicles Symposium, 2009, IEEE.
Mount, D. et al., "ANN: A library for approximate nearest neighbor searching," http://www.cs.umd.edu/~mount/ANN/, 2010.
Ning, X. et al., "Segmentation of architecture shape information from 3D point cloud," 2009 VRCAI '09 Proceedings of the 8th International Conference on Virtual Reality Continuum and its Applications in Industry, pp. 127-132.
Pauly, M. et al., "Shape modeling with point-sampled geometry," Proceedings of ACM SIGGRAPH 2003, ACM Press, 2003, pp. 641-650.
Petitjean, S., "A survey of methods for recovering quadrics in triangle meshes," ACM Computing Surveys, vol. 2, No. 34, Jul. 2002, pp. 1-61.
Rabbania, T. et al., "Segmentation of Point Clouds Using Smoothness Constraint," 2006, International Archives of Photogrammetry, Remote Sensing and Spatial Information Sciences, vol. 36, No. 5, pp. 248-253.
Rusin, D., "Topics on sphere distributions," http://www.math.niu.edu/~rusin/known-math/95/sphere.faq, Feb. 26, 1998.
Schnabel, R. et al., "Shape detection in point clouds," Computer Graphics Technical Reports, vol. 26, issue 2, 2006, pp. 214-226.
Schnabel, R., "Efficient Point-Cloud Processing with Primitive Shapes," 2009, Dissertation University of Bonn (Germany), pp. 6-53.
Shah, T. et al., "Automatic reconstruction of industrial installations using point clouds and images," Ph.D Dissertations of TU Delft, ISBN-10:90 6132 297 9, 2005.
Taubin, G., "Estimation of planar curves, surfaces, and nonpolar space curves defined by implicit equations with applications to edge and range image segmentation," IEEE Transactions on Pattern Analysis and Machine Intelligence, vol. 13, No. 11, Nov. 1991, 1115.

(56) References Cited

OTHER PUBLICATIONS

Trucco, E. et al., "Experiments in curvature-based segmentation of range data," PAMI 17(2), 1995, pp. 177-182.

Willis, A. et al., "Accurately estimating sherd 3D surface geometry with application to pot reconstruction," Proceedings of the 2003 Conference on Computer Vision and Pattern Recognition Workshop, vol. 1, 2003.

Zhu, X. et al., "Segmentation and Classification of Range Image from an Intelligent Vehicle in Urban Environment," IEEE/RSJ International Conference on Intelligent Robots and Systems, 2010, pp. 1457-1462, Taipei, Taiwan.

\* cited by examiner

Initial Status:

| M[0] | M[1] | M[2] | M[3] | M[4] | M[5] | M[6] | M[7] | M[8] | M[9] |
|------|------|------|------|------|------|------|------|------|------|
| 0 | 1 | 2 | 3 | 4 | 5 | 6 | 7 | 8 | 9 |

1st Run: Object 4 is linked to Object 2:

| M[0] | M[1] | M[2] | M[3] | M[4] | M[5] | M[6] | M[7] | M[8] | M[9] |
|------|------|------|------|------|------|------|------|------|------|
| 0 | 1 | 2 | 3 | 2 | 5 | 6 | 7 | 8 | 9 |

2nd Run: Object 9 is linked to Object 2:

| M[0] | M[1] | M[2] | M[3] | M[4] | M[5] | M[6] | M[7] | M[8] | M[9] |
|------|------|------|------|------|------|------|------|------|------|
| 0 | 1 | 2 | 3 | 2 | 5 | 6 | 7 | 8 | 4 |

3rd Run: Object 7 is linked to Object 9:

| M[0] | M[1] | M[2] | M[3] | M[4] | M[5] | M[6] | M[7] | M[8] | M[9] |
|------|------|------|------|------|------|------|------|------|------|
| 0 | 1 | 2 | 3 | 2 | 5 | 6 | 4 | 8 | 7 |

SEGMENTATION OF GROUND-BASED LASER SCANNING POINTS FROM URBAN ENVIRONMENT

CROSS-REFERENCE TO RELATED APPLICATIONS

This application is related to the following co-pending and commonly-assigned patent application, which application is incorporated by reference herein:

U.S. patent application Ser. No. 12/849,647, entitled "PIPE RECONSTRUCTION FROM UNORGANIZED POINT CLOUD DATA", by Yan Fu, Xiaofeng Zhu, Jin Yang, and Zhenggang Yuan, filed on Aug. 3, 2010, which application claims priority to Provisional Application Ser. No. 61/353, 486, filed Jun. 10, 2010, by Yan Fu, Xiaofeng Zhu, Jin Yang, and Zhenggang Yuan, entitled "PIPE RECONSTRUCTION FROM UNORGANIZED POINT CLOUD DATA"; and U.S. patent application Ser. No. 12/849,670, entitled "PRIMITIVE QUADRIC SURFACE EXTRACTION FROM UNORGANIZED POINT CLOUD DATA", by Yan Fu, Xiaofeng Zhu, Jin Yang, and Zhenggang Yuan, filed on Aug. 3, 2010, which application claims priority to Provisional Application Ser. No. 61/353,492, filed Jun. 10, 2010, by Yan Fu, Jin Yang, Xiaofeng Zhu, and Zhenggang Yuan, entitled "PRIMITIVE QUADRIC SURFACE EXTRACTION FROM UNORGANIZED POINT CLOUD DATA".

BACKGROUND OF THE INVENTION

1. Field of the Invention

The present invention relates generally to point cloud data, and in particular, to a method, apparatus, and article of manufacture for automatically segmenting point cloud data from an urban environment into objects.

2. Description of the Related Art (Note: This application references a number of different publications as indicated throughout the specification by references enclosed in brackets e.g., [x]. Such references may indicate the first named authors and year of publication e.g., [Jones 2002]. A list of these different publications ordered according to these references can be found below in the section entitled "References." Each of these publications is incorporated by reference herein.)

Laser scanner equipment is increasingly employed for surveying and urban planning, etc. The data acquired by ground-based laser scanners is extensive and dense. Further, the data (referred to as point-cloud data) is difficult to interpret especially when no color or intensity information is available. Segmentation is a critical pre-processing step in the interpretation of the scanned environment. In this regard, segmentation refers to the operation that separates points into different groups based on spatial characteristics without knowing what the groups really are. Segmentation is used to identify the object shape and then extract the shape descriptors. Segmentation results in a semantic description of the environment that can be used to support high-level decisions. Moreover, the quality of a classification of an object can also be improved based on segmentation results. To better understand segmentation, a description of the prior art and related work may be useful.

When a laser scanner is used to scan a scene/urban environment, the scene often contains many objects. It is difficult to determine which points belong to which objects in the scene. For example, if a city block is laser scanned, in addition to an office building, there may be many objects such as trees, vegetation, roads, etc. It is desirable to pick out which points belong to the building and which points belong to the vegetation, to the ground, and to other roads. Segmentation is performed to separate the points into various groups/objects in order to classify the points. Various methods have been attempted in the prior art to quickly and efficiently segment laser-scanned data. However, most of the prior art techniques are problematic with large ground based complex streets/scenes.

The topic of point cloud segmentation has been researched for several years. In some scenarios, segmentation is performed on a point cloud scanned from a single object and the goal is to decompose the point cloud into separate surface patches. Embodiments of the present invention only focus on the related works of segmentation of point clouds from an urban environment. Urban environments are usually very complex and consist of many objects. Further, the surfaces of the objects are not smooth and it is difficult to estimate the differential geometric properties. In view of such properties, it can be seen that other segmentation methods are quite different from the surface patch segmentation of point clouds.

Some researchers segment three-dimensional (3D) laser point cloud based on a graph cut method such as a normalized cut and minimum (min) cut [Boykov 2006]. Aleksey et al. [Alkeskey 2009] segmented the foreground points from the background points by a min cut method on a 3D graph built on a nearest neighbor graph. Such a method requires prior knowledge of the location of the objects to be segmented. Zhu et. al [Zhu 2010] also proposed a graph-based segmentation of range images in an urban environment. However, Zhu's method requires the removal of ground points beforehand.

Another category of segmentation approaches (other than the graph-based segmentation) are focused on the explicit modeling of surface discontinuity. Melkumyan [Melkumyan 2008] first built a 3D mesh from the point cloud data and then defined the discontinuity based on the long edge and acute angle of the mesh. However, the mesh reconstruction of laser scanning data from an outdoor environment is not trivial in itself. Moonsmann [Moonsmann 2009] segments ground and objects from 3D LiDAR (light detection and ranging) scans based on local convexity measures. Although such a method is fast and may show good results in some kind of urban environments, it is not general enough to handle the cases with overhanging structures.

Segmentation approaches based on statistics are also explored by Hernandez and Marcotegui [Hernandez 2009]. The 3D points are projected to a horizontal plane. The number of points projected to the same cell is accumulated to form an accumulated image and the maximal height in each cell is extracted to form a range image. However, this method assumes that the principal objects in the scene are facade buildings and that the ground data is perpendicular to facade data. Accordingly, such an approach is not general for other environments.

In view of the above, what is needed is the ability to segment point cloud data of an urban environment scene in order to remove extraneous objects and separate the point cloud data into individual objects for further processing.

SUMMARY OF THE INVENTION

Segmentation of laser scanning data provides an object descriptor of the scanned environment, which facilitates the scene interpretation and urban environment management. Embodiments of the invention provide a method to segment the point cloud data from ground-based laser scanners. Ground filtering is used in a preprocess phase to filter out most of the terrain points. Afterwards, the remaining terrain points are further extracted based on the local terrain surface property. Non-ground points above the terrain are clustered into individual objects based on cell continuity. Measurements of cell continuity can be adaptively adjusted to prevent over-segmentation problems. To handle large scenes of an urban environment, block-based segmentation may be used and then the objects in the different blocks may be combined. Segmentation of points in different blocks can be also parallelized to improve time efficiency.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a system for automatically segmenting point cloud data of 3D scans from an urban environment into small objects. The segmentation methodology is mainly based on the adjacency of object components. To remove the link of objects caused by terrain points, ground filtering is used to filter out most of the terrain points in a preprocess phase. Afterwards, the remaining terrain points are further extracted based on the local terrain surface property. After the connection through terrain is fully eliminated, non-ground points above the terrain are clustered into individual objects based on cell continuity. Measurement of cell continuity can be adaptively adjusted to prevent over-segmentation problems. Due to the large scale and density of laser scanned points from an urban environment, significant memory is consumed during the segmentation process. Accordingly, embodiments of the invention subdivide the whole scan into small blocks and then handle each block individually. The resulting small patches are then combined together to obtain the final segmentation. This approach not only dramatically reduces the memory requirement but also facilitates parallelization.

Hardware Environment

Figure 1:
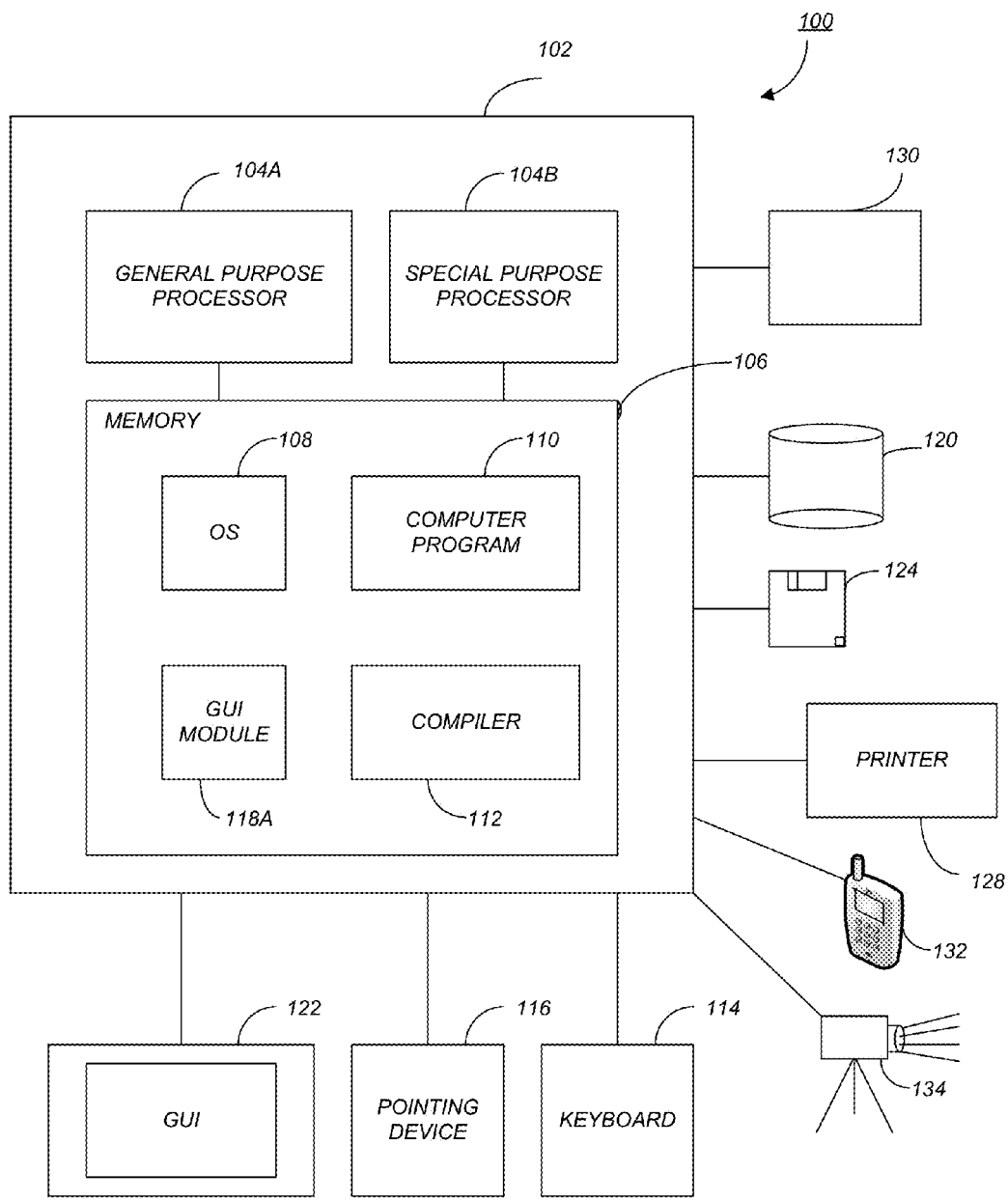
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a laser scanning device 134. Such a laser scanning device 134 is configured to scan an object or urban environment and obtain a digital representative of such an object/environment in the form of point cloud data that may be processed by the computer 102.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI)

module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 that allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, cause the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
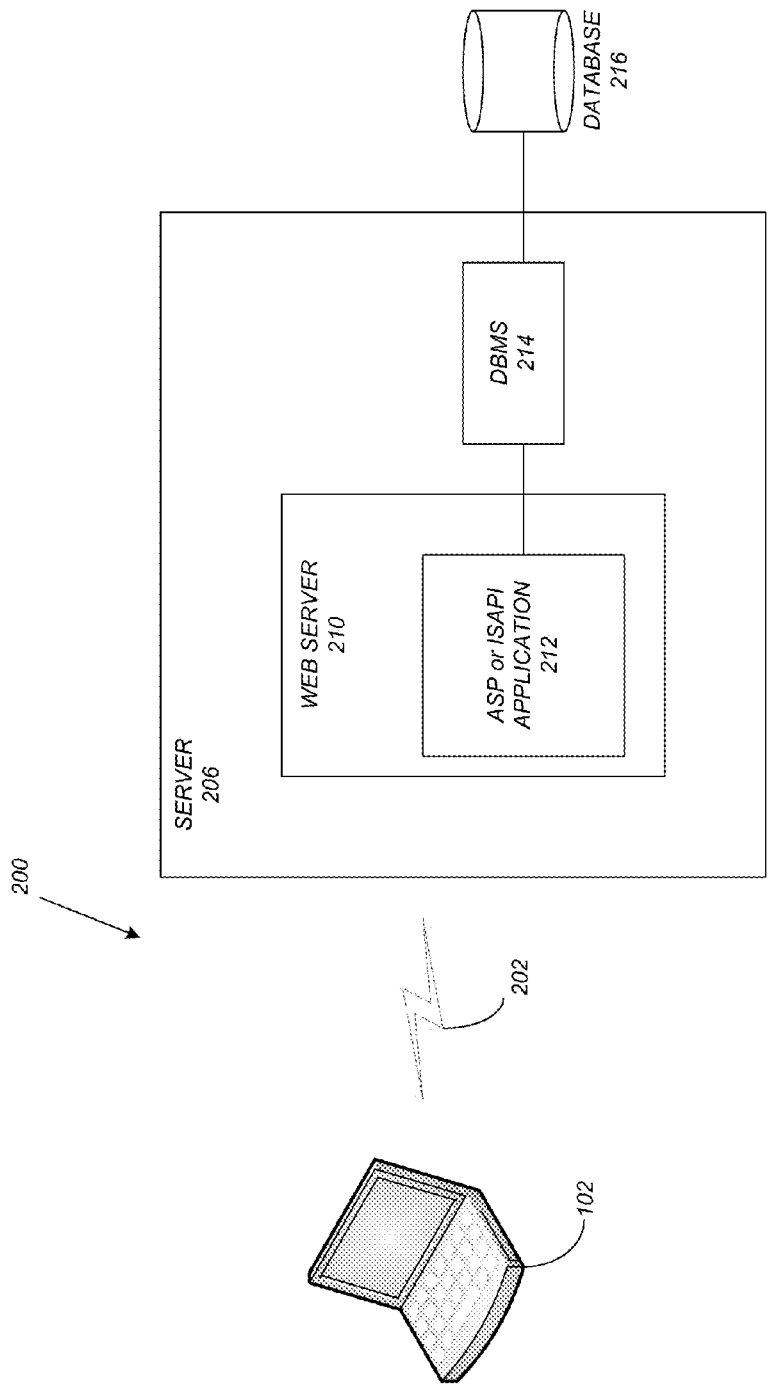
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 102 and servers 206 in accordance with embodiments of the invention.

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Software Embodiment Overview

Embodiments of the invention are implemented as a software application on a client 102 or server computer 206. Further, as described above, the client 102 or server computer 206 may comprise a thin client device or a portable device that has a multi-touch-based display and that may comprise (or may be coupled to or receive data from) a 3D laser scanning device 134.

Figure 3:
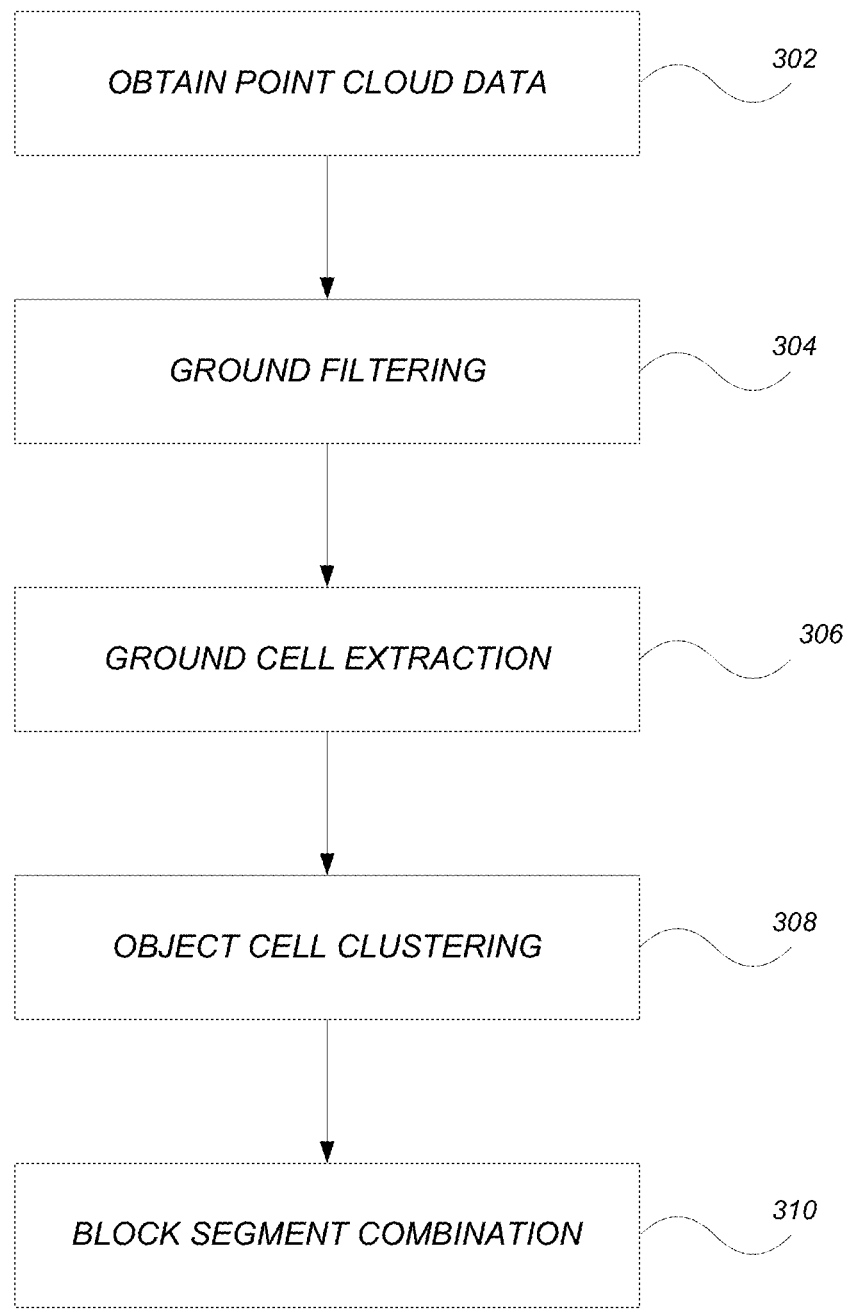
FIG. 3 illustrates the overall logical flow for performing segmentation in accordance with one or more embodiments of the invention.

FIG. 3 illustrates the overall logical flow for performing the segmentation in accordance with one or more embodiments of the invention.

At step 302, the point cloud data is obtained.

At step 304, ground filtering is performed to filter out most of the terrain points.

At step 306, the remaining terrain points are further extracted based on the local terrain surface property.

At step 308, non-ground points above the terrain are clustered into individual objects based on cell continuity.

At step 310, block-based segmentation is used to handle a large scene of an urban environment and then combined.

Steps 304-310 are described in detail in the following sections.

Preprocessing—Ground Filtering

Step 304 is the pre-processing stage that filters out ground/terrain points. Ground point filtering has been researched for decades. Many approaches have been proposed that automatically and robustly filter ground points and non-ground points. In the laser scanning data segmentation process, it is desirable to involve ground points filtering only as a preprocessing step. In this regard, efficiency and robustness may be considered important. In one or more embodiments of the invention, the basic idea of the robust interpolation DTM determination method [Kraus 2001, Briese 2002] may be used for ground filtering. However, embodiments of the invention may further simplify the method to make it faster.

To enable the filtering, and based on the large amount of point cloud data for an urban environment, embodiments of the invention may first subdivide the point cloud data into different patches. Thereafter, ground point filtering is performed in each individual patch.

Patch Subdivision

The first step in subdividing the patches is determining the appropriate size of the patches. The principle of patch size selection is that: (1) the terrain surface in a patch should not vary too much; and (2) there is at least one ground point in each patch. Thus, each patch may be selected to have equal length and width. The length and width are adaptively set according to the mean distance of the point cloud data.

An efficient mechanism that avoids the construction of KNN (k-nearest neighbor) information may be employed to estimate the mean distance. Firstly, the entire point cloud data is roughly subdivided to make each patch have approximately 1000 points: the number of patches in x/y axis is calculated by $\sqrt{(N/1000)}$, and the length and width of the rough patches are calculated accordingly by the bounding box and the number of patches. Secondly, the patch with most points is selected. KNN information is generated only for the points in this patch. For each point, the mean distance from this point to its six (6) neighbors is calculated. The final mean distance is estimated to be the mean value of the mean distances of the points in this patch. In other words, a sample set of points may be rendered and the distances of the neighbors for the points in the sample set are calculated and used to calculate the mean distance. Such a mean distance represents the resolution/density of the point cloud data.

After the mean distance is estimated, the patch length/width can be set to be a fixed multiple (e.g., 100) of the mean distance. The bounding box of the point cloud data is subdivided into patches with equal length and width in both x and y axes but not in the z axis. Thereafter, the points are distributed into the patches.

Such a patch subdivision scheme not only reduces the peak memory required but also makes the filtering process more efficient by reducing the dimension of the points in a single run.

Ground Point Filtering in Individual Patches

Outlier Removal

Due to the complexity and dynamic of the urban environment, outliers might exist in the point cloud data. To provide a more robust system, such outliers should be removed before performing substantive filtering. First, the nearest neighborhood information is constructed for the points in one patch. Thereafter, each point is examined. Considering the terrain surface is usually continuous and doesn't have very steep jumping, outliers may be filtered out based on the following criteria: if the height of a point is much higher or lower than the mean distance of the point's neighborhood, then the point is regarded as an outlier point and will not participate in the ground filtering process. Such outlier removal serves to remove most of the outliers and reduce disturbances in the plane fitting phase of ground filtering process.

Classification of Ground Points and Non-Ground Points

Figure 4:
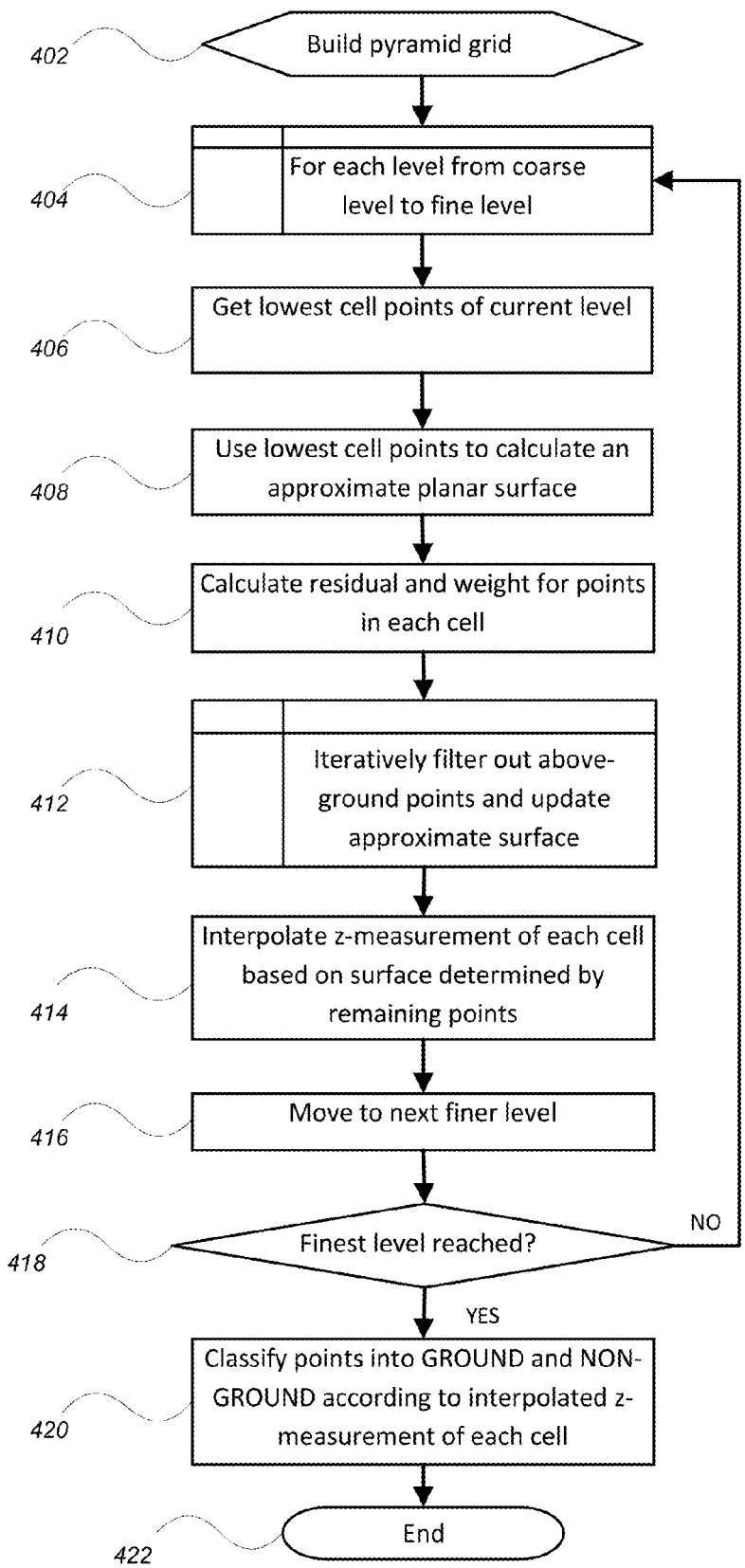
FIG. 4 illustrates the logical flow for eliminating non-ground points in accordance with one or more embodiments of the invention.

To separate ground points and non-ground points (points on bushes, tresses, and buildings), the non-ground points may be eliminated in a hierarchical approach as described below and in the flow chart of FIG. 4. Accordingly, FIG. 4 illustrates the logical flow for eliminating non-ground points in accordance with one or more embodiments of the invention.

At step 402, a pyramid cell structure is constructed to achieve the hierarchical structure.

At step 404, the process begins for filtering out the non-ground points from coarse to fine. The level of the pyramid is adaptively adjusted according to the parameter setting of the patch size and the grid interval to make sure that the number of cells in the coarsest level ranges from 4 to 8.

At step 406, the lowest points in each cell of the coarsest level are obtained as representative points of coarse terrain surface.

At step 408, these lowest points are used to compute a rough approximation of the surface. In embodiments of the invention, a planar surface may be used to interpolate the representative points.

At step 410, the oriented distances (residual) from the rough surfaces to the points in the cells are computed. Each z-measurement is weighted by its residual value. If the residual is larger than a certain threshold, the points is filtered out as a non-ground point and eliminated from the surface interpolation. The points below or on the approximation surface are assigned high weight (1.0) and the points above the approximation surface are assigned weight according to the following weight function:

$$w_i = \frac{1}{1+(a(r_i-g)^b)}$$

where $r_i$ is the residual value; g is a shift value determined automatically from the distribution of the residual values; and the values a, b may be can set as described in [Briese 2002]. Thus, step 410 utilizes a weighting function to determine the weight of each point based on the point's distance to the plane.

At steps 412-418, the above-ground points are iteratively filtered out and the approximate surface is updated. In this regard, the first step is to update the approximation surface under the consideration of the weights. Points with high weights will attract the surface and points with low weights will have less influence on the surface interpolation. Some embodiments of the invention may utilize a robust linear interpolation where Kriging interpolation is used to interpolate the surface at step 414. Such interpolation involves extensive matrix computations and leads to low performance. Therefore, a weighted plane fitting may be used to interpolate the surface. However, the use of a weighted plane fitting may lead to a negative effect on the ground filtering result. Nonetheless, compared with the performance problem, some extent of accuracy loss may be worthwhile.

The process of surface interpolation (i.e., steps 412 and 414) may be repeated iteratively until all the non-ground points are filtered out or a maximum number of iterations is reached (i.e., via steps 416 and 418). Meanwhile, at step 414, the z-measurement of the center points in each cell is saved for next level comparison.

At step 416, the cell of the next finer level of the pyramid is obtained. Once all the levels have been processed, (i.e., the finest level has been reached per step 418), the processing continues at step 420. At step 420, the z-measurement of each point in a cell is compared with the z-measurement of the center point in the cell. If the signed distance is above a distance threshold, then the point is classified as a non-ground point and eliminated from surface interpolation. The remaining points in the cell are used for the lowest point calculation. Such processing is performed for each level (e.g., per step 404).

Accordingly, at step 420, all of the points are classified by comparing the z-measurement with the interpolated z-measurement of the cell center of the finest level. If the z-measurement of a point is a threshold higher than the interpolated z-measurement of the cell center point, then the point is classified as NON-GROUND point, otherwise, it is classified as GROUND point.

The process is complete at step 422.

In view of FIG. 4, one may note that a weighted plane is used to interpolate a surface. Thereafter, non-ground points are filtered out based on the surface. Such a step is useful to remove the non-ground points and obtain the terrain. The terrain points can then be removed—thereby removing the connection among objects so that the objects can be properly segmented as described below (i.e., there are no extraneous points that link two objects together in a manner that prohibits or makes it more difficult to perform segmentation).

Point Cloud Segmentation

Once ground points have been filtered out, the point cloud data may be segmented in an attempt to find/classify/separate the different objects in the point cloud data.

The segmentation method used by embodiments of the invention belongs to the category of surface discontinuity based segmentation. The threshold for discontinuity is defined to be $\epsilon$. To solve the memory requirement problem caused by large scale data and the density of laser scanning points from an urban environment, the whole scan may be divided into small blocks that are then each handled individually.

Patch Subdivision and Grid Construction

The entire point cloud is subdivided into blocks. Usually, the scan does not extend excessively in the upright (vertical) direction. Accordingly, the point cloud data may only be subdivided in the x/y directions. Firstly, the bounding box of the whole point cloud is subdivided along the x and y direction to form some rectangular blocks. The points are then distributed to each block. The length of each block can be adaptively set to be a multiple of the predefined threshold of discontinuity $\epsilon$ according to the memory capacity. For each block, the block is organized in a 3D cubic grid structure. The cell dimension in the grid structure is set to be the threshold of discontinuity $\epsilon$. This kind of cell structure is a simple representation of point connectivity. An empty cell between two non-empty cells means a discontinuity exists between the points in the non-empty cells. It should also be noted that sparse sampling of the environment will cause the increase of non-empty cells and thus resulting in over-segmentation of the point cloud data.

In view of the above, one may note that the same subdivision as that used above (in the ground point filtering process) may be used. Alternatively, a new subdivision schema may be utilized. The subdivisions (i.e., into small blocks) are needed to reduce memory consumption and decrease the processing needed.

Accordingly, as described above, patches/blocks must be made the right size to make sure the size of the patch is not less than the density of the points (which may vary based on the height of the objects from the ground) but are large enough to determine if there is a gap that defines an empty space. Thus, various distances may be used to measure the gap between the objects including the use of a threshold that may be based on the mean distance (e.g., 10× or 20× the mean distance). If there is a gap between the points that is greater than the threshold, the objects may be regarded as being disconnected.

Ground Points Removal

Figure 5:
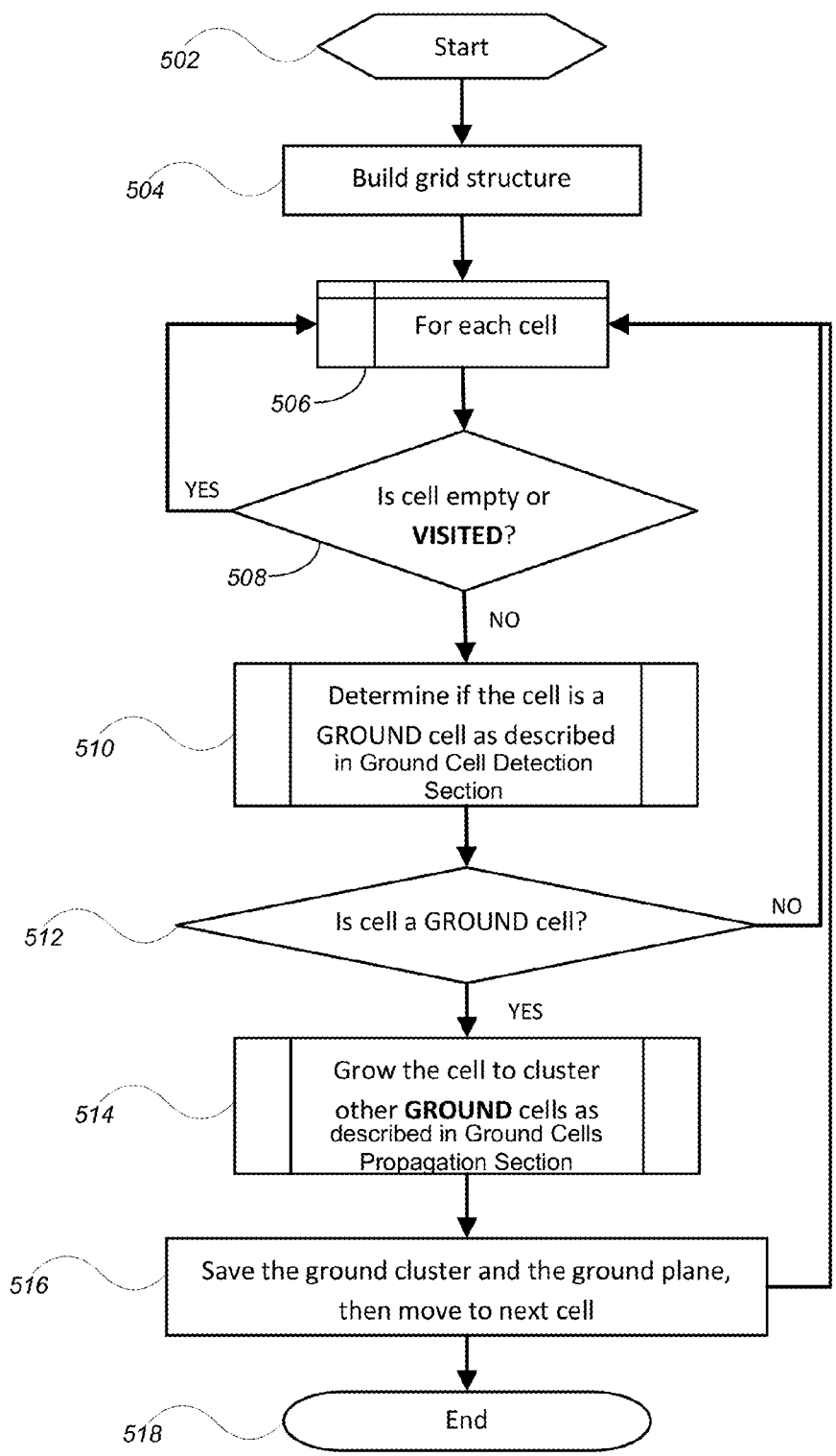
FIG. 5 is a flow chart illustrating an additional ground point removal process in accordance with one or more embodiments of the invention.

Even though most of the ground points have been filtered in the preprocessing phase, there still might be some ground points remaining, which will affect the subsequent segmentation process. Therefore, embodiments of the invention may utilize an additional ground point removal process before the segmentation. FIG. 5 is a flow chart illustrating the additional ground point removal process in accordance with one or more embodiments of the invention.

The second ground points removal process beings at step 502. At step 504, a grid structure is built (i.e., for each patch). As described above, the grid structure is a 3D cubic grid structure that defines the cells in each rectangular block. With the grid structure, it is possible to determine the height of points (with respect to the grid) to determine whether they are ground points or not. For ground points, it may be assumed that remaining terrain points in the cell will be planar. If it can be detected whether points in a cell are planar, then the height of the cell to the bottom of the grid may also be determined. In this regard, if a non-empty cell exists beneath a cell being examined, then the cell being examined cannot be a ground cell because there cannot be any other points below the ground. Therefore, embodiments of the invention attempt to locate the lowest set of cells in a grid.

Step 506 determines whether all of the cells have been processed. Thus, the steps below step 506 are repeated for each cell.

At step 508, a determination is made regarding whether a cell is empty or has been visited already. If the cell is empty or has already been visited/processed, the procedure proceeds to the next cell at step 506. If the cell is not empty and has not been visited/processed, a determination is made regarding whether the cell is a ground cell at step 510 and as set forth below in the "Ground Cell Detection" section. The results of, the determination are evaluated at step 512.

If the cell is not a ground cell, the process proceeds to the next cell by returning to step 506. If the cell is a ground cell, the cell is grown to cluster other ground cells at step 514 and as set forth below in the "Ground Cells Propagation" section. The ground cluster and ground plane are saved at step 516, and the process then proceeds to the next cell at step 506.

The process is complete at step 518.

Ground Cell Detection

Figure 6:
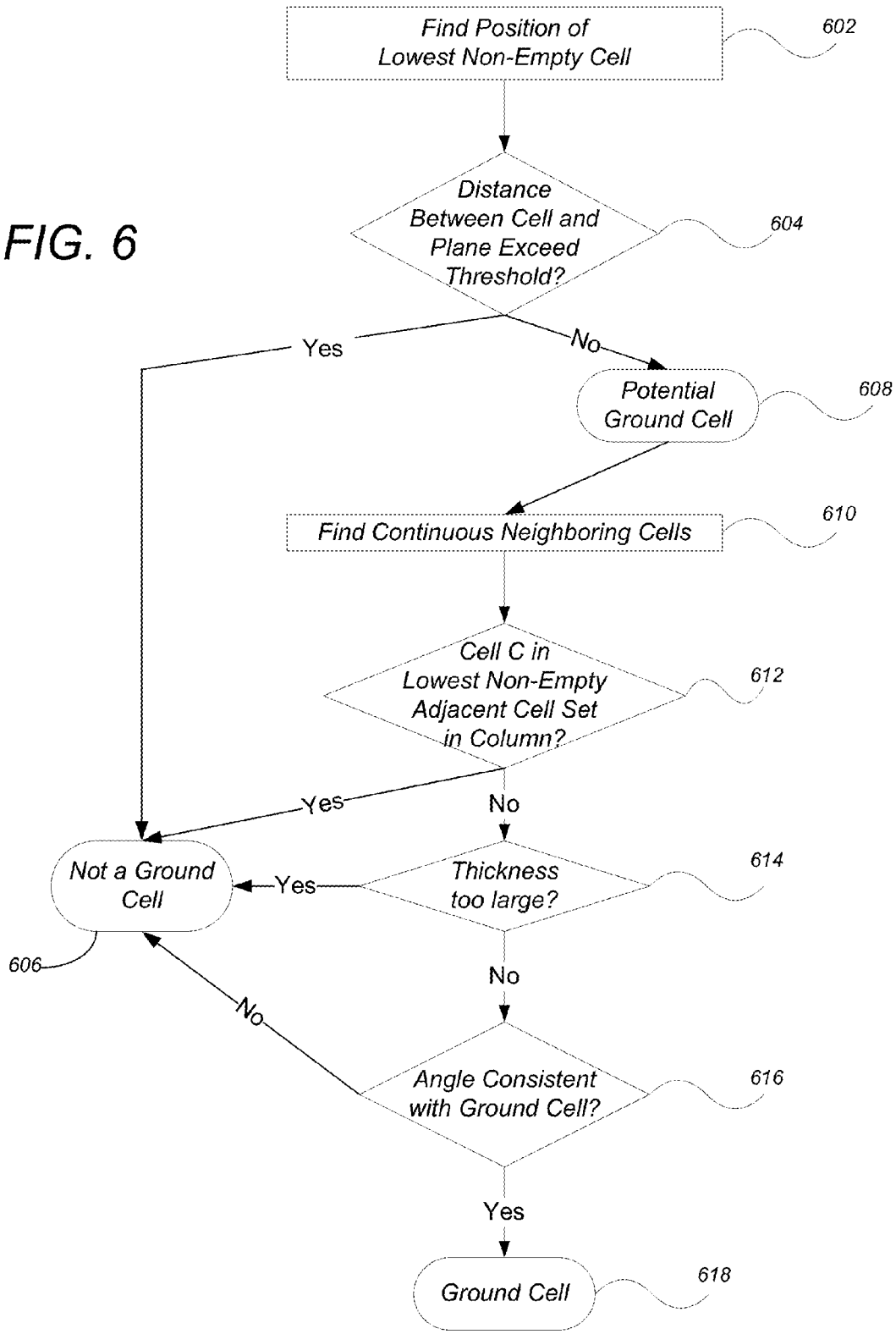
FIG. 6 illustrates the logical flow for detecting a ground cell in accordance with one or more embodiments of the invention.
Figure 7:
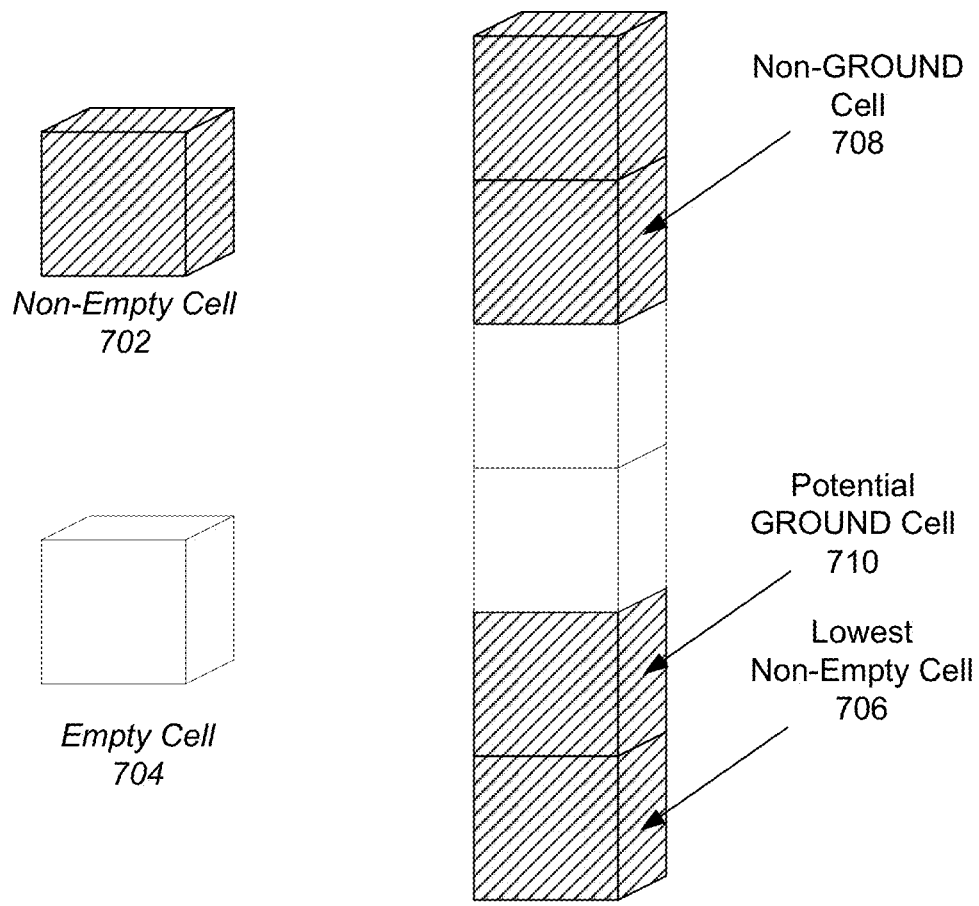
FIG. 7 illustrates a diagram of empty, non-empty, non-ground, and potential ground cells in accordance with the flow chart of FIG. 6 in accordance with one or more embodiments of the invention.

Based on the observation that the remaining ground points are usually in small neighborhood regions, such points may be removed by clustering adjacent cells once a ground cell is detected. A ground cell is detected according to the steps set forth in the flow chart of FIG. 6 in view of the diagram of FIG. 7. In FIG. 7, there are non-empty cells 702 and empty cells 704 (i.e., empty/non-empty referring to whether there are points in a particular cell). In general, a ground cell should be one of the lowest non-empty neighboring cells. It may be assumed that there cannot be any other points below the ground. Thus, ground cells must be the lowest set of cells in a grid. The process therefore evaluates each cell and determines whether it is a ground cell or not. Suppose the cell being examined is named as cell C.

At step 602, the position of the lowest non-empty cell 706 in the same column of cell C is found.

At step 604, the distance between the lowest non-empty cell and the bottom of the bounding box of the block is checked. If the distance is larger than a predefined threshold, then it means the cell might belong to an object far above the ground surface, such as a roof, thus this cell is not used for further examination (i.e., it is not a ground cell at 606). Referring to FIG. 7, such a cell may be the non-ground cell 708. Thus, the distance between the points in the cell 708 to the bottom of the grid bounding box may be calculated and then compared to a distance threshold. Such a threshold is used to determine whether the plane is raised from the horizontal plane (e.g., such as a roof, top of a wall, etc.).

If the threshold distance is not exceeded, the cell is marked as a potential ground cell 710 at step 608.

At step 610, the continuous neighboring cells of the lowest non-empty cell in this vertical column are found. This kind of continuous neighboring cells is named as the lowest non-empty adjacent cell set. For example, in FIG. 7, the bottom two non-empty cells constitute a lowest non-empty adjacent cell set. A check is then conducted (at step 612) to determine if cell C is among the lowest non-empty adjacent cell set in the vertical column. This criterion is used to exclude overhanging points such as leaves on the trees (i.e., outliers). If cell C is not in the lowest non-empty adjacent cell set in the column, the cell is not a ground cell at 606.

If cell C is in the lowest non-empty adjacent cell set in the column, then the thickness of the lowest non-empty adjacent cell set being evaluated is examined at step 614. If the thickness of the lowest non-empty adjacent cells is too large, cell C is rejected as a ground cell. This criterion is used to exclude points on a vertical surface such as a building façade. In other words, if the cell is too thick, then the cells in this column are likely a building or other object that should not be considered a ground cell.

If the thickness is not too large, then the system evaluates the angle of the points in the cell. To perform such a calculation, a plane is determined (from the points in the cell) and the angle of the plane is determined. If the angle is too steep from the horizontal plane, it cannot be a ground cell. Accordingly, at step 616, the planarity of the plane is checked using the points in the lowest non-empty adjacent cells. If the points in the cells are not planar enough, then the cell cannot be a ground cell at 606. Further, if the plane is too steep from the horizontal plane, cell C is also not regarded as a ground cell. If the angle is consistent with the angle of a ground cell, the system marks the cell as a ground cell at step 618.

If the cell C is marked as a ground cell, the fitting plane information may also be saved for subsequent processing.

Ground Cell Propagation

After a ground cell is detected, it is propagated to its adjacent cells to cluster the ground cells. In other words, to further filter out the ground cells, once one ground cell is detected, it is propagated/clustered with nearby cells and examined to determine if the points in the cell belong to the ground plane.

Figure 8:
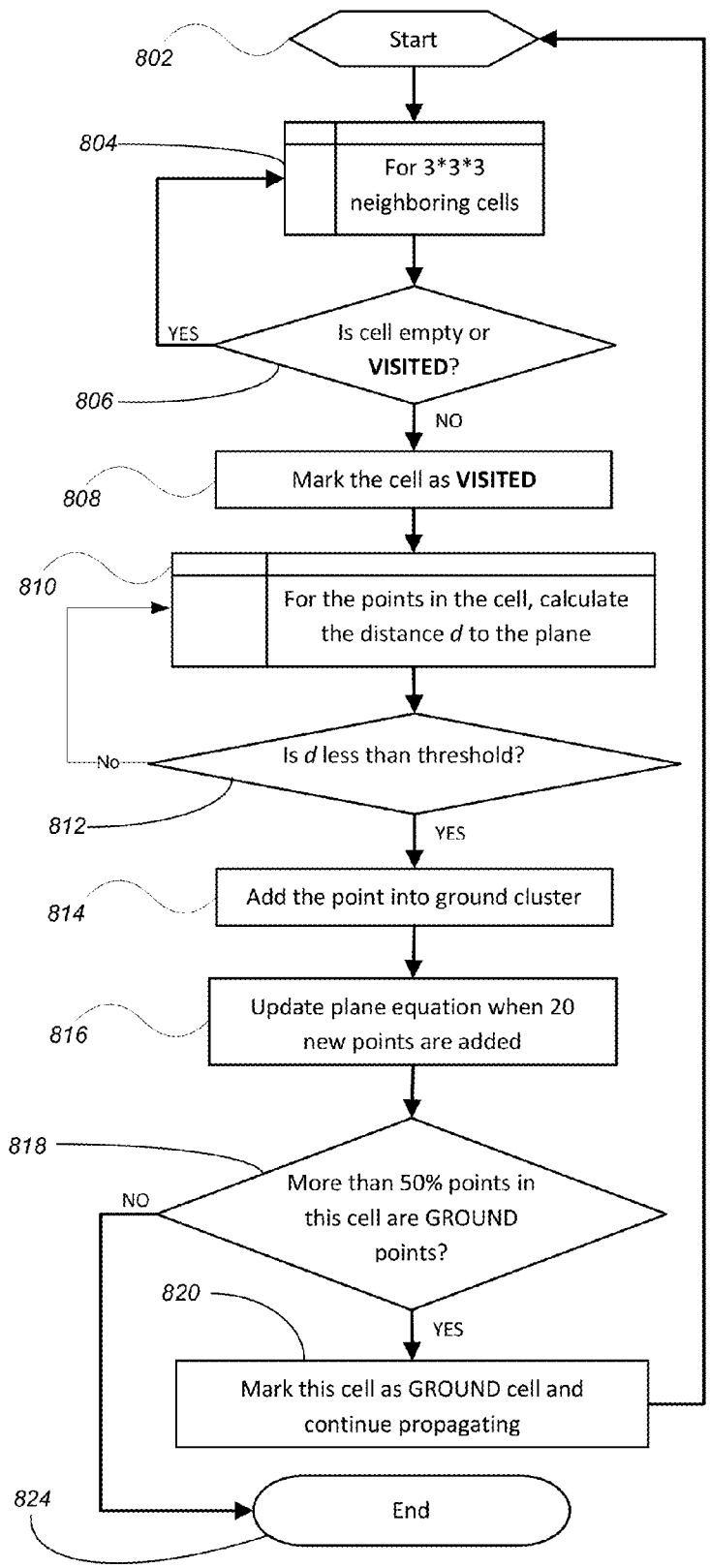
FIG. 8 illustrates the logical flow for conducting ground cell propagation in accordance with one or more embodiments of the invention.

FIG. 8 illustrates the logical flow for conducting ground cell propagation in accordance with one or more embodiments of the invention. The process starts at step 802.

The propagation is conducted in a seed-filling manner. In this regard, to avoid a stack overflow problem, a non-recursive seed-filling method may be utilized. Steps 804-808 ensure that each neighboring cell of a ground cell (referred to herein as cell C) is evaluated. In this regard, an evaluation regarding whether a neighboring cell is empty or has been visited in the past is conducted at step 806 for every 3*3*3 neighboring cells of cell C (per step 804). If the neighboring cell is not empty (i.e., contains points) and has not yet been visited, the neighbor cell is marked as being visited at step 808, and the process continues.

Step 810 ensures that the remaining steps are performed for every point in an unvisited non-empty neighbor cell (e.g., via a "for" loop). Thus, each point in an unvisited neighboring cell of cell C is checked to see if it is located on the plane. To perform such a determination, a distance d from each point to the plane is calculated.

A comparison between the distance d and a threshold value is conducted at step 812. If the distance from a point to the plane is more than the threshold value, the point does not lie on the plane, and the process continues back at step 810.

If the distance from a point to the plane is less than the distance threshold, then the point is added into the plane point set (i.e., of the ground cluster) at step 814. Once twenty (20) new points (or some other number of points) have been added to the ground cluster/plane point set, the plane equation (i.e., the definition/representation of the plane) is updated at step 816.

A determination is made at step 818 regarding whether or not fifty percent (50%) or more of the points in the cell have been added to the GROUND cluster (i.e., if more than 50% of the points in the cell are ground points). If not, the process is finished at step 824 (e.g., for the point being evaluated and if it is the last point, then the entire process is complete).

If most points (more than 50%) in a cell lie on the plane, this cell is marked as a GROUND cell at step 820 and used for further growing/propagating by returning to step 802.

This process iterates until no more points belonging to the plane can be found.

In view of the above, once the ground cells have been detected and propagated, the system is more confident that the ground points have been removed/filtered out, and that the links between non-ground points have been cut-off/removed. Accordingly, the process may then continue with the non-ground point segmentation.

Non-Ground Point Segmentation

It may be assumed that the cells of an object are continuous, i.e., each component cell is connected to some other (at least one) component cell of the object. The assumption is true for most of the objects existing in an urban environment. Therefore, after the removal of ground points, the connection among the objects disappears. Thus, the continuity information can be used as the sole criterion to segment the remaining non-ground points into separate objects.

The segmentation starts from a random NONGROUND cell and propagates to its continuous neighboring cells using a non-recursive seed-filling method as in the ground cell propagation (described above). To merge the segmentation results from different small blocks, the cell information for cells on the border of the block are stored. Since the whole scene is only subdivided in the x-y plane not in the z plane, it is only necessary to store the indices of objects containing boundary cells on the four side faces—LEFT, RIGHT, FRONT and BACK. In this regard, embodiments of the invention first select a random non-empty cell, then propagate the non-empty cell to continuous neighboring cells, and lastly, if the non-empty cell is a border cell of one of the two or more blocks, an object index for the object containing the border cell is stored in the side face cells of the block.

One may note that the methodology described herein is targeted for ground-based laser scanning data and it is known that point density decreases with the height of objects from the ground. Therefore, in the NONGROUND cell growing process, the neighborhood range may be adaptively adjusted for objects above a certain distance from the ground to prevent over-segmentation problems.

Combination of Block Segmentation

During the process of patch subdivision, one object might be subdivided into several blocks. Therefore, after the segmentation in each block, the objects lying on two neighboring adjacent blocks need to be combined. The combination is checked both on adjacent block boundary faces and neighboring diagonal block corners.

As described above with respect to the non-ground points segmentation, objects lying on the side faces of the block have been saved. In the combination process, objects of neighboring cells in different blocks should belong to one object. The combination process begins with a search for neighboring objects and then proceeds to combine the objects. In this regard, the search compares neighboring cells to each other to see if they all have neighboring objects. Thereafter, if the cells contain neighboring objects, the objects are combined into one object.

Neighboring Objects Search

The search for neighboring objects first searches for adjacent 4—neighboring patches and then searches for diagonal patches. It may be noted, that the grid structure that is often used to subdivide the data was not subdivided in the z-plane and was only subdivided in the x-y plane. Accordingly, embodiments of the invention may only be concerned with the x-y direction while searching for neighboring objects. Further, boundary cells are only defined on four (4) planes— front, right, back and left (the top and bottom need not be examined).

Adjacent Patches

Figure 9B:
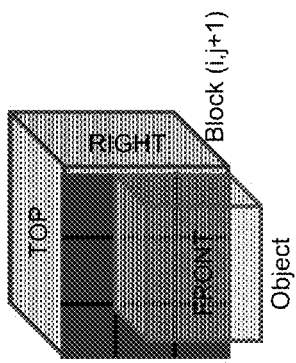
FIGS. 9A and 9B illustrate merge objects lying on adjacent boundary faces of neighboring blocks in accordance with one or more embodiments of the invention.
Figure 9A:
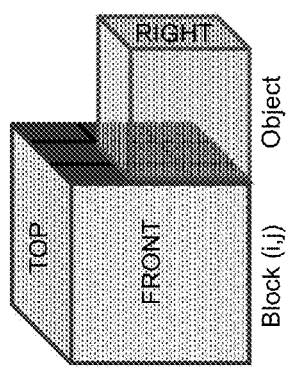

Of the four sides of the border faces, only two sides of a patch need to be checked: (1) the RIGHT side of block (i, j) with the LEFT side of block (i+1, j) (see FIG. 9A); and (2) the BACK side of block (i,j) with the FRONT side of block (i, j+1) (see FIG. 9B). Thus, FIGS. 9A and 9B illustrate merge objects lying on adjacent border faces of neighboring blocks in accordance with one or more embodiments of the invention. Overlapped cells on adjacent sides are checked to see if there are neighboring objects. As used herein, "neighboring objects" means one cell of the object is in the 3*3 neighboring cells of another object. Neighboring objects are merged into one object.

Diagonal Patches

Figure 10B:
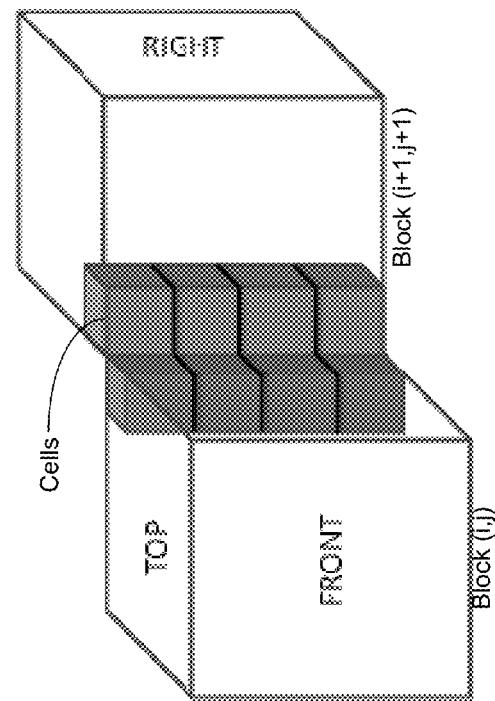
FIGS. 10A and 10B illustrate merge objects lying on diagonal corner columns of neighboring blocks in accordance with one or more embodiments of the invention.
Figure 10A:
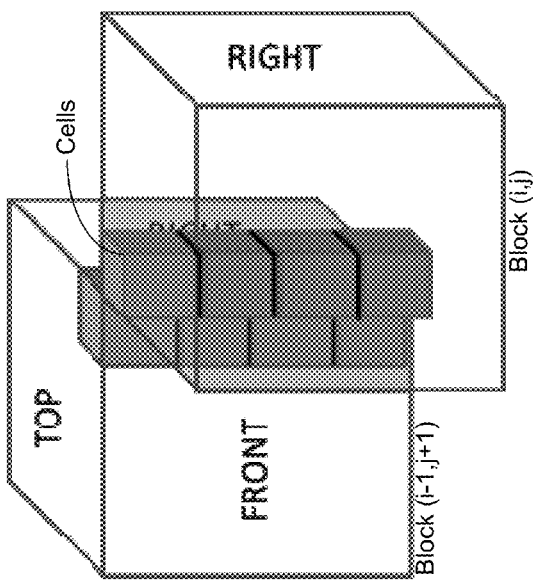

For a block (i, j), it may only be necessary to check its BACK_LEFT corner column with FRONT_RIGHT corner column of block (i−1, j+1) (see FIG. 10A) and its BACK_RIGHT corner column with the FRONT_LEFT corner column of patch (i+1, j+1). Each cell in the corner column is examined to see if there are neighboring objects in its 3 neighboring cells. Neighboring objects are merged into one object (similar to that of the adjacent patches as described below). Thus, FIGS. 10A and 10B illustrate merge objects lying on diagonal corner columns of neighboring blocks in accordance with one or more embodiments of the invention.

Object Combination

After two neighboring objects in different blocks are found, the points of the objects may not be immediately merged. Instead, an array M may be used to mark which object each object will be merged to. An object with a larger index is always merged to an object with a smaller index and the value of the array is recursively updated to always store the closest small index of its adjacent objects, forming an object link. Such actions facilitate the combination of the objects as the final step. Table 1 illustrates pseudo code that may be followed to set the array and merge the objects.

TABLE 1

METHOD FOR OBJECT MERGE SETTING

```
void SetMergeToObject(M, s, t)
{
    if (M[s] == s || M[s] == t)
        M[s] = t;
    else
    {
        if (M[s] > t)
            SetMergeToObject(M, M[s], t);
        else
        {
            r = vObjectMergeTo[s];
            vObjectMergeTo[s] = t;
            SetMergeToObject(M, t, r);
        }
    }
}
```

As illustrated in Table 1, the array M is provided with two object indices s and t that need to be merged. At the first step, if the array location of s (i.e., M[s]) has the s or t index stored therein, the t index is stored at the location. If the array location for s (i.e., M[s]) has an index larger than t, the function is recursively called to replace the larger index with the smaller index. Thereafter, the objects are merged.

In other words, an array is used to store the combination results.

Figures 11A, 11B:
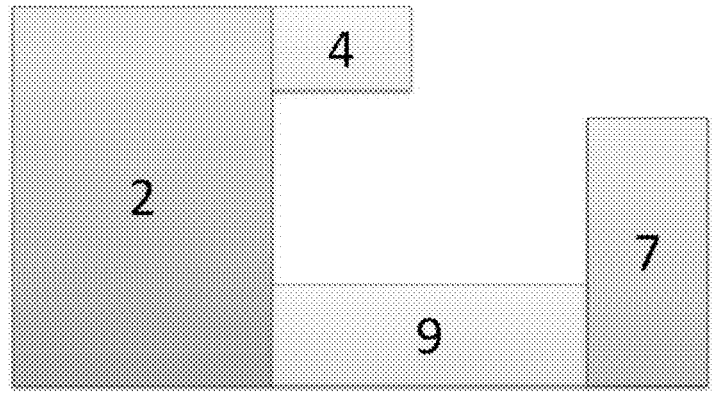
FIGS. 11A and 11B illustrate an example of the value change of array M during an object combination process in accordance with one or more embodiments of the invention.

FIGS. 11A and 11B illustrate an example of the value change of array M during the object combination process. FIG. 11A illustrates the layout of objects 2, 4, 7, and 9. FIG.

11B illustrates the status of the array during the merge process. The initial status of the array M provides that the index for each object is stored in the corresponding array location.

During the first run, object 4 is linked to object 2. In other words, the two objects to be merged are objects 2 and 4. During the processing, the array entry for object 4 (i.e., M[4]) is set to 2.

In the second run, objects 9 and 2 are processed. During the processing, the value of the array for object 9 (i.e., M[9]) is changed from 9 to 4. Since the array value for object 4 (i.e., M[4]) has the value of 2, object 9 is linked to object 2 via the array.

In the third run, objects 9 and 7 are processed. During the processing, the lower array index (i.e., M[7]) points to the lowest value (i.e., 4 taken from M[9]) and the array index for the higher object (i.e., M[9]) is reset to point to object 7. Thus, object 7 is linked to object 9 and 4.

In view of the above, one may note that since the object link information is stored in descending order starting from the biggest index, the process always merges an object with the bigger index to an object with a smaller index, i.e. start from the object with biggest index i and merge this object to object of MN. Thus, the object with the biggest index, 9, is merged to the object identified at M[9]—i.e., object 7. Similarly, the object with the next largest index, 7, is merged to the object identified at M[7]—i.e., object 4. Likewise, object 4 is merged to the object identified at M[4]—i.e., object 2. In this way, all the linked objects will be combined to one object.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, a method, apparatus, article of manufacture, and computer program product provides the ability to segment point cloud data scanned by ground based laser scanners from an outdoor urban environment. The workflow of this method is simple and easy to be implemented. Further, embodiments of the invention can achieve a good tradeoff between the accuracy and efficiency of processing. With the novel block combination methodology, the segmentation can be processed block by block, thus reducing the memory requirement. In addition, shape descriptors of the resulting objects can be calculated for further analysis such as classification. Moreover, the segmentation organizes the whole point cloud data in terms of objects and thus is better for interpretation and visualization.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

ALEKSEY GOLOVINSKIY AND THOMAS FUNKHOUSER. Min-Cut Based Segmentation of Point Clouds. IEEE Workshop on Search in 3D and Video (S3DV) at ICCV, September 2009.

ALEKSEY GOLOVINSKIY, VLADIMIR G. KIM, AND THOMAS FUNKHOUSER. SHAPE-BASED RECOGNITION OF 3D POINT CLOUDS IN URBAN ENVIRONMENTS. INTERNATIONAL CONFERENCE ON COMPUTER VISION ICCV), September 2009. BOYKOV, Y., AND FUNKA-LEA., G., Graph cuts and efficient n-d image segmentation. IJCV, 70 (2): 109-131, 2006, 4.6.

BRIESE, C., PFEIFER, N., & DORNINGER, P., 2002, Application of the Robust Interpolation for DTM Determination, IAPRS, vol. XXXIII, pp. 55-61.

DOUILLARD, B., UNDERWOOD, J. P., KUNTZ, N., VLASKINE, V., QUADROS, A., MORTON, P. & FRENKEL, A. On the Segmentation of 3D LIDAR Point Clouds, International Conference on Robotics and Automation (ICRA) 2011, 2011.

J. HERNÁNDEZ AND B. MARCOTEGUI. Morphological Segmentation of Building Facade Images. ICIP09—IEEE International Conference on Image Processing 2009. Cairo, Egypt.

KRAUS K., PFEIFER N., 2001: Advanced DTM Generation from LiDAR DATA. International. Archives of Photogrammetry and Remote Sensing, Vol XXXIV, 3/W4.

MOOSMANN, F.; PINK, O.; STILLER, C., 2009, Segmentation of 3D lidar data in non-flat urban environments using a local convexity criterion, Intelligent Vehicles Symposium, 2009 IEEE.

MELKUMYAN, NAREK, Surface-based Synthesis of 3D Maps for Outdoor Unstructured Environments. PhD thesis, University of Sydney, Australian Center for Filed Robotics, 2008.

ZHU, X., ZHAO, H., LIU, Y., ZHAO, Y., AND ZHA, H., 2010, Segmentation and classification of range image from an intelligent vehicle in urban environment. In proceeding of the IEEE/RSJ International Conference on Intelligent Robots and Systems (IROS), 1457-1462, 2010.

What is claimed is:

1. A computer-implemented method for providing object descriptors for objects in point cloud data for an urban environment by segmenting the point cloud data in a computer that is programmed to perform:

obtaining, using a ground-based laser scanner, the point cloud data, wherein the point cloud data is for the urban environment;

in a pre-process phase, filtering out, in the computer, terrain points from the point cloud data using ground filtering;

after the pre-process phase, segmenting, in the computer, the point cloud data into two or more blocks;

combining, in the computer, objects that lie on neighboring adjacent blocks of the two or more blocks based on cell continuity;

providing, in the computer, object descriptors for the combined objects;

utilizing, in the computer, the object descriptors to process the point cloud data, and facilitate and output a scene interpretation of the urban environment.

2. The computer-implemented method of claim 1, wherein the ground filtering comprises:

subdividing the point cloud data into two or more patches; and filtering out the terrain points in each patch one patch at a time.

3. The computer-implemented method of claim 2, wherein:

a size of each of the two or more patches is defined wherein each patch contains at least one of the terrain points; and a length and width of each patch is adaptively set based on a mean distance of the point cloud data.

4. The computer-implemented method of claim 2, wherein the filtering out the terrain points in each patch one patch at a time comprises performing the following for each patch:
  removing outlier points;
  classifying ground points and non-ground points; and
  filtering out the ground points.

5. The computer-implemented method of claim 4, wherein the removing outlier points comprises:
  constructing nearest neighborhood information for all of the points in patch P;
  defining a mean distance of the nearest neighborhood information for each point in patch P;
  examining each point in patch P; and
  removing the point as an outlier point if a height of the point is above or below a threshold amount from the mean distance.

6. The computer-implemented method of claim 4, wherein the classifying ground points and non-ground points comprises:
  building a hierarchical structure of two or more cells for the patch being filtered, wherein the hierarchical structure ranges from coarse to fine;
  for each level from coarse to fine:
    obtaining lowest cell points of a current level as representative points of a coarse terrain surface;
    using the lowest cell points to calculate an approximate planar surface;
    calculating a weighted residual from the approximate planar surface to each point in each cell;
    iteratively filtering out points that have a weighted residual above a threshold as non-ground points;
    updating the approximate planar surface using the weighted residuals for points that have not been filtered out; and
    interpolating a z-measurement of each cell based on the updated approximate planar surface; and
  classifying all of the remaining points by comparing the z-measurement of each remaining point with an interpolated z-measurement of a cell center of the finest level, wherein if the z-measurement of each remaining point is a threshold higher than the interpolated z-measurement of the cell center, then the point is classified as a non-ground point, and if not, the point is classified as a ground point.

7. The computer-implemented method of claim 1, wherein the segmenting comprises removing additional ground points by:
  subdividing the point cloud data into the two or more blocks;
  distributing points from the point cloud data to each of the two or more blocks;
  organizing each block into a three-dimensional (3D) cubic grid structure having two or more cells;
  for each cell of the two or more cells;
    determining if the cell is a ground cell based on a grounded plane;
    if the cell is a ground cell, propagating the cell to adjacent cells of the two or more cells in order to create a ground cell cluster;
    saving the ground cell cluster and the grounded plane; and
    filtering out the ground cell cluster.

8. The computer-implemented method of claim 1, wherein:
  the point cloud data is subdivided into the two or more blocks;
  points from the point cloud data are distributed to each of the two or more blocks;
  each block is organized into a three-dimensional (3D) cubic grid structure having two or more cells;
  subsequent to filtering out the terrain points, remaining points of the point cloud data represent the objects;
  the segmenting the point cloud data comprises:
    selecting a random non-empty cell from the two or more cells;
    propagating the non-empty cell to continuous neighboring cells; and
    if the non-empty cell is a boundary cell of one of the two or more blocks, storing an object index for the object containing the boundary cell.

9. The computer-implemented method of claim 1, wherein the combining comprises:
  searching for objects that lie on neighboring adjacent blocks by determining if one cell of a first object is in one of 3*3 neighboring cells of a second object; and
  merging the first object and the second object when both the first object and the second object lie on neighboring adjacent blocks.

10. The computer-implemented method of claim 9, wherein the merging comprises:
  utilizing an array to mark that the first object will be merged to the second object thereby creating an object link; and
  merging the first object into the second object based on the object link.

11. An apparatus for providing object descriptors for objects in point cloud data for an urban environment by segmenting the point cloud data in a computer system comprising:
  (a) a computer having a memory; and
  (b) an application executing on the computer, wherein the application is configured to:
    (1) obtain, using a ground-based laser scanner, the point cloud data, wherein the point cloud data is for the urban environment;
    (2) in a pre-process phase, filter out terrain points from the point cloud data using ground filtering;
    (3) after the pre-process phase, segment the point cloud data into two or more blocks;
    (4) combine objects that lie on neighboring adjacent blocks of the two or more blocks based on cell continuity;
    (5) provide object descriptors for the combined objects;
    (6) utilize the object descriptors to process the point cloud data, and facilitate an output a scene interpretation of the urban environment.

12. The apparatus of claim 11, wherein the ground filtering comprises:
  subdividing the point cloud data into two or more patches; and
  filtering out the terrain points in each patch one patch at a time.

13. The apparatus of claim 12, wherein:
  a size of each of the two or more patches is defined wherein each patch contains at least one of the terrain points; and
  a length and width of each patch is adaptively set based on a mean distance of the point cloud data.

14. The apparatus of claim 12, wherein the application is configured to filter out the terrain points in each patch one patch at a time by performing the following for each patch:
  removing outlier points;
  classifying ground points and non-ground points; and
  filtering out the ground points.

15. The apparatus of claim 14, wherein the removing outlier points comprises:

constructing nearest neighborhood information for all of the points in patch P;

defining a mean distance of the nearest neighborhood information for each point in patch P;

examining each point in patch P; and removing the point as an outlier point if a height of the point is above or below a threshold amount from the mean distance.

16. The apparatus of claim 14, wherein the classifying ground points and non-ground points comprises:

building a hierarchical structure of two or more cells for the patch being filtered, wherein the hierarchical structure ranges from coarse to fine;

for each level from coarse to fine:

obtaining lowest cell points of a current level as representative points of a coarse terrain surface;

using the lowest cell points to calculate an approximate planar surface;

calculating a weighted residual from the approximate planar surface to each point in each cell;

iteratively filtering out points that have a weighted residual above a threshold as non-ground points;

updating the approximate planar surface using the weighted residuals for points that have not been filtered out; and interpolating a z-measurement of each cell based on the updated approximate planar surface; and classifying all of the remaining points by comparing the z-measurement of each remaining point with an interpolated z-measurement of a cell center of the finest level, wherein if the z-measurement of each remaining point is a threshold higher than the interpolated z-measurement of the cell center, then the point is classified as a non-ground point, and if not, the point is classified as a ground point.

17. The apparatus of claim 11, wherein the application is configured to segment by removing additional ground points by:

subdividing the point cloud data into the two or more blocks;

distributing points from the point cloud data to each of the two or more blocks;

organizing each block into a three-dimensional (3D) cubic grid structure having two or more cells;

for each cell of the two or more cells;

determining if the cell is a ground cell based on a grounded plane;

if the cell is a ground cell, propagating the cell to adjacent cells of the two or more cells in order to create a ground cell cluster;

saving the ground cell cluster and the grounded plane; and filtering out the ground cell cluster.

18. The apparatus of claim 11, wherein:

the point cloud data is subdivided into the two or more blocks;

points from the point cloud data are distributed to each of the two or more blocks;

each block is organized into a three-dimensional (3D) cubic grid structure having two or more cells;

subsequent to filtering out the terrain points, remaining points of the point cloud data represent the objects;

the segmenting the point cloud data comprises:

selecting a random non-empty cell from the two or more cells;

propagating the non-empty cell to continuous neighboring cells; and if the non-empty cell is a boundary cell of one of the two or more blocks, storing an object index for the object containing the boundary cell.

19. The apparatus of claim 11, wherein the application is configured to combine by:

searching for objects that lie on neighboring adjacent blocks by determining if one cell of a first object is in one of 3*3 neighboring cells of a second object; and merging the first object and the second object when both the first object and the second object lie on neighboring adjacent blocks.

20. The apparatus of claim 19, wherein the application is configured to merge by:

utilizing an array to mark that the first object will be merged to the second object thereby creating an object link; and merging the first object into the second object based on the object link.

* * * * *